(12) United States Patent  (10) Patent No.: US 8,126,658 B2
Nonomura et al.  (45) Date of Patent: Feb. 28, 2012

(54) SHAPE DEFECT FACTOR IDENTIFICATION METHOD, DEVICE, AND PROGRAM

(75) Inventors: Kiyoshi Nonomura, Toyota (JP); Jiro Iwaya, Kakogawa (JP); Takayuki Yamano, Kakogawa (JP)

(73) Assignees: Toyota Jidosha Kabushiki Kaisha, Toyota-shi (JP); Kabushiki Kaisha Kobe Seiko Sho, Kobe-shi (JP)

( * ) Notice: Subject to any disclaimer, the term of this patent is extended or adjusted under 35 U.S.C. 154(b) by 470 days.

(21) Appl. No.: 12/438,649

(22) PCT Filed: Aug. 24, 2007

(86) PCT No.: PCT/JP2007/066963
§ 371 (c)(1),
(2), (4) Date: Feb. 24, 2009

(87) PCT Pub. No.: WO2008/026716
PCT Pub. Date: Mar. 6, 2008

(65) Prior Publication Data
US 2010/0241366 A1   Sep. 23, 2010

(30) Foreign Application Priority Data
Aug. 28, 2006 (JP) ................................. 2006-231028

(51) Int. Cl.
*G01B 3/00* (2006.01)
(52) U.S. Cl. ........................................................ 702/33
(58) Field of Classification Search ............... 702/33, 702/42
See application file for complete search history.

(56) References Cited

U.S. PATENT DOCUMENTS
6,353,768 B1 * 3/2002 Karafillis et al. ............... 700/97

FOREIGN PATENT DOCUMENTS
JP   2000-312933 A   11/2000
(Continued)

*Primary Examiner* — Drew A Dunn
*Assistant Examiner* — Stephen Cherry
(74) *Attorney, Agent, or Firm* — Kenyon & Kenyon LLP

(57) ABSTRACT

Provided is a method for rapidly, surely, and easily identifying a factor of a shape defect of an artifact attributed to elastic recovery of deformation upon molding by using the numeric value simulation technique, thereby eliminating lowering of dimension accuracy. The method includes a step of calculating a stress distribution and distortion distribution working on an artifact before elastic recovery; a step of calculating a deformation amount δ0 based on the elastic recovery of an evaluation point when the stress distribution is given to the artifact shape before the elastic recovery; a step of dividing the artifact shape into a plurality of regions and calculating a deformation amount δn based on the elastic recovery of the evaluation point when the stress distribution is given to each of the regions of the artifact shape before the elastic recovery; and a step of comparing the deformation amount δ0 and the deformation amount δn and identifying a region where the difference between them is minimum as a main affect region, i.e., a stress distribution region which most affects the shape defect of the evaluation point before and after the elastic recovery.

9 Claims, 15 Drawing Sheets

FOREIGN PATENT DOCUMENTS

| | | |
|---|---|---|
| JP | 2003-033828 A | 2/2003 |
| JP | 2003-312933 A | 11/2003 |
| JP | 2003-340528 A | 12/2003 |
| JP | 2003-340529 A | 12/2003 |
| JP | 2005-028410 A | 2/2005 |
| JP | 2006-031594 A | 2/2006 |
| JP | 2006-315063 A | 11/2006 |
| JP | 2006-341295 A | 12/2006 |

* cited by examiner

F I G. 6
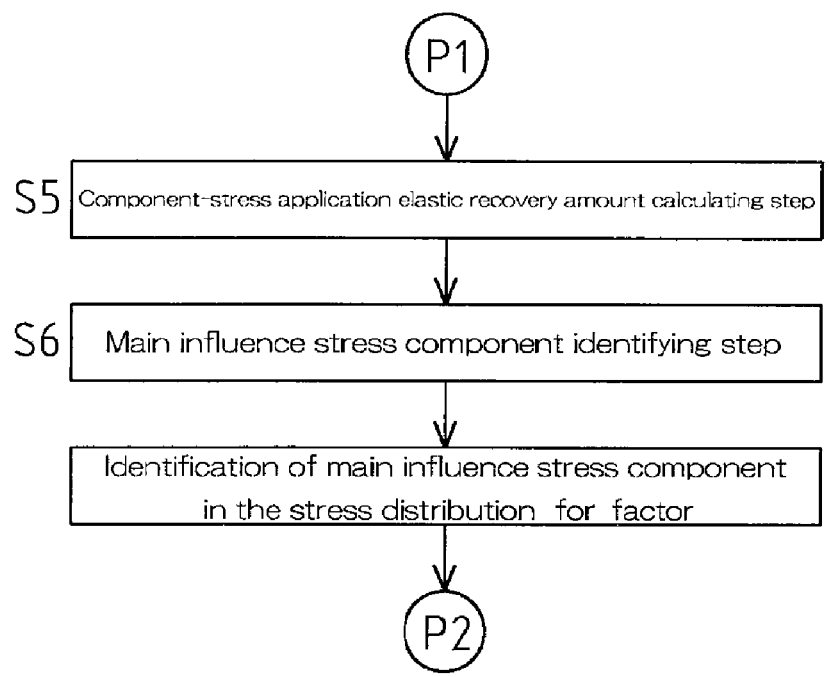

F I G. 1 0
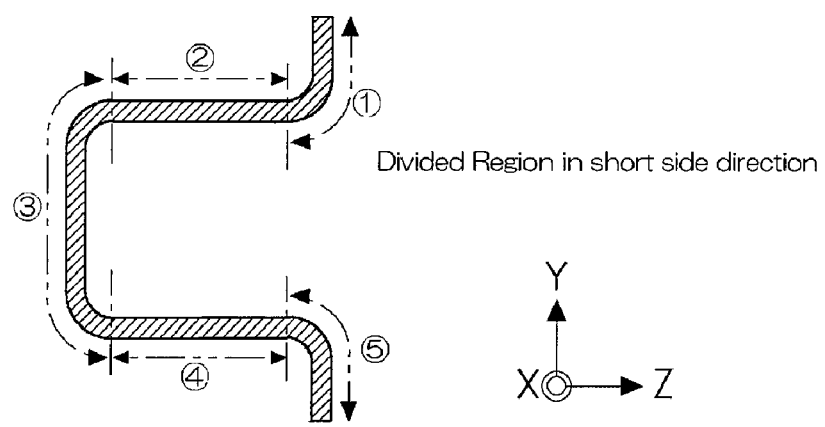

F I G. 1 1
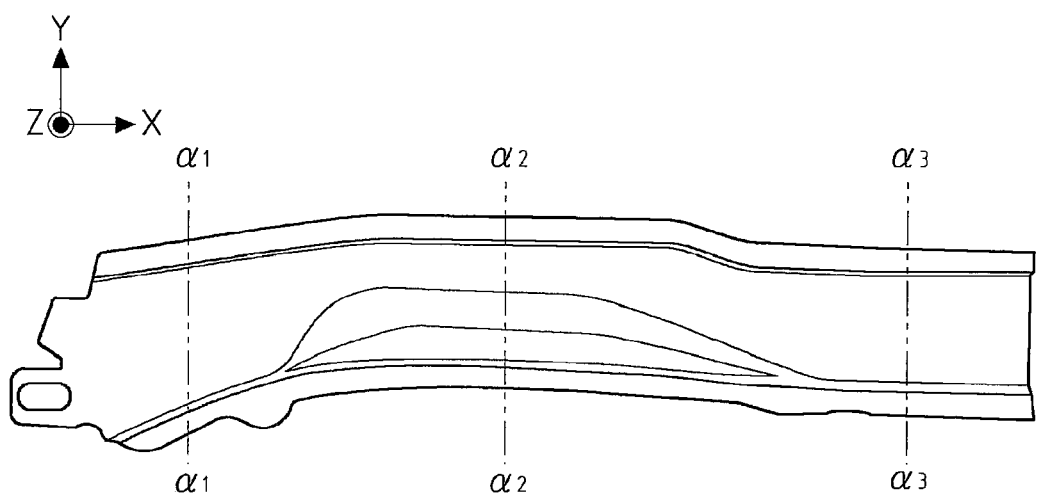
End View along α1-α1 line    End View along α2-α2 line    End View along α3-α3 line
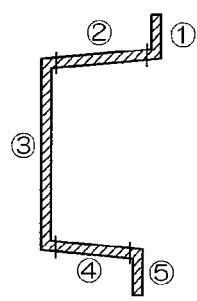 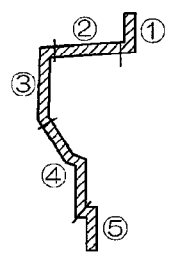 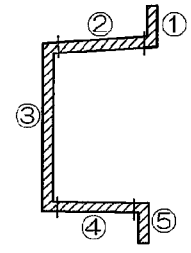

F I G. 1 3

| region 9: deformation amount | $\delta 9 = -2.34$ mm |
|---|---|
| region 9: deformation amount in X direction | $\delta 9x = -2.68$ mm |
| region 9: deformation amount in Y direction | $\delta 9y = 0.42$ mm |
| region 9: deformation amount in Z direction | $\delta 9z = -0.08$ mm |

SHAPE DEFECT FACTOR IDENTIFICATION METHOD, DEVICE, AND PROGRAM

This is a 371 national phase application of PCT/JP2007/066963 filed 24 Aug. 2007, claiming priority to Japanese Patent Application No. 2006-231028 filed 28 Aug. 2006, the contents of which are incorporated herein by reference.

TECHNICAL FIELD

The present invention relates to a technique of identifying the factor of dimensional accuracy defect (shape defect) of work arising from elastic recovery of deformation in plastic forming such as casting, rolling, extrusion processing, drawing process, press working, or the like.

BACKGROUND ART

It is conventionally known that when performing plastic forming, a dimensional accuracy of the work lowers due to the elastic recovery (spring back) that appears when restriction by a molding tool, such as the die which applies deformation on the material to be processed, is released from the work.

Numerous automobile parts have a complex shape such as curving shape or cross-sectional shape changing at any portion, and thus identification of the cause of elastic recovery of deformation is difficult and it takes time to investigate the cause. The cause of elastic recovery of deformation differs depending on the shape and the material of the work, and thus it was difficult to perform appropriate countermeasures on the elastic recovery of deformation for every work in a short period of time after clarifying the cause of elastic recovery of deformation.

Thus, instead of excluding the cause of elastic recovery of deformation that lowers the dimensional accuracy, in order to reduce the shape defect of the work arising from the elastic recovery of the deformation, the shape of the molding tool such as the die is designed so that design dimension is obtained in a state the deformation applied to the work is elastically recovered.

For instance, JP-2003-33828-A proposes a simulation technique of calculating the stress distribution in a state where the plate material is pressed to a molding bottom dead center of the die using elastoplastic finite element analysis, calculating the elastic recovery amount of the plate material based on the stress distribution, and correcting the die so as to match the shape of the plate material after elastic recovery in the press molding process of molding a plate material (material to be processed) with a die (molding tool).

In recent years, the high strength steel plate is widely used in automobile constituting parts and has a large elastic recovery amount of deformation by plastic forming, and thus demand for a more advanced solution is increasing on the reduction of dimensional accuracy failure. In addition, the developing period of the automobile has been shortened recently, and development of the plastic forming technique capable of rapidly and reliably reducing the dimensional accuracy failure is being desired.

As described above, the simulation technique of determining the shape of the molding tool so that the shape of the work after elastic recovery matches the designed shape is also effective on the high strength steel plate, but the elastic recovery amount of deformation during the molding process is larger in the high strength steel plate in comparison with the normal steel plate, and it is sometimes difficult to create the molding tool in view of the elastic recovery of deformation.

Therefore, it is required to develop a technique of clarifying the cause for elastic recovery of deformation in the molding process, capable of removing the cause, resolving lowering in dimensional accuracy, and of preventing defect in shape.

DISCLOSURE OF THE INVENTION

The present invention aims to provide a technique capable of rapidly, reliably, and easily identifying the factor for shape defect of work arising from elastic recovery of deformation using numerical simulation in molding process, and resolving lowering in dimensional accuracy.

A shape defect factor identification program according to a first aspect of the present invention relates to a shape defect factor identification program for causing a computer to execute a process of acquiring a deformation amount based on an elastic recovery of a certain evaluation point of before and after the elastic recovery in a case where stress distribution that acts on a work before elastic recovery is applied to the work before elastic recovery, and acquiring a region-stress application deformation amount based on the elastic recovery of the evaluation point of before and after the elastic recovery in a case where the work shape is divided into a plurality of regions set in advance, and the stress distribution is applied to the work shape before elastic recovery for every region; and comparing the deformation amount with the region-stress application deformation amount, and identifying a region having the smallest difference thereof as a main influence region that is a stress distribution region most related to a shape defect of the evaluation point of before and after the elastic recovery.

Preferably, in the shape defect factor identification program, the program further causes the computer to execute a process of acquiring a component-stress application deformation amount based on the elastic recovery of the evaluation point of before and after the elastic recovery in a case where the stress distribution acting on the main influence region is decomposed in each direction component of an orthogonal coordinate system and applied to the work shape before elastic recovery; and comparing the region-stress application deformation amount in a case where the stress distribution of the main influence region is applied with the component-stress application deformation amount, and identifying the stress component in a direction having the smallest difference thereof as a main influence stress component that is the stress component most related to the shape defect of the evaluation point of before and after the elastic recovery.

Preferably, in the shape defect factor identification program, the program further causes the computer to execute a process of acquiring a deformation amount based on the elastic recovery of the evaluation point of before and after the elastic recovery in a case where the stress distribution in which the main stress component acting on substantially the middle in a plate-thickness direction of the main influence region is evenly distributed over the entire range in the plate-thickness direction of the main influence region is applied to the work shape before elastic recovery; and comparing the deformation amount with the component-stress application deformation amount in a case where the main influence stress component is applied to the main influence region, and determining presence of influence of the stress difference of front and back of a plate thickness of the main influence stress component on the shape defect of the evaluation point of before and after the elastic recovery.

A shape defect factor identification device according to a second aspect of the present invention relates to a shape defect factor identification device including a stress distribution calculating unit for calculating a stress distribution that acts on a work before elastic recovery; an elastic recovery amount calculating unit for calculating a deformation amount based on an elastic recovery of a certain evaluation point of before and after the elastic recovery in a case where the stress distribution is applied to the work before elastic recovery; an elastic recovery amount calculating unit for calculating a region-stress application deformation amount based on the elastic recovery of the evaluation point of before and after the elastic recovery in a case where the work shape is divided into a plurality of regions set in advance, and the stress distribution is applied to the work shape before elastic recovery for every region; and a comparison calculating unit for comparing the deformation amount with the region-stress application deformation amount, and identifying a region having the smallest difference thereof as a main influence region that is a stress distribution region most related to a shape defect of the evaluation point of before and after the elastic recovery.

Preferably, the shape defect factor identification device further includes an elastic recover amount calculating unit for calculating a component-stress application deformation amount based on the elastic recovery of the evaluation point of before and after the elastic recovery in a case where the stress distribution acting on the main influence region is decomposed in each direction component of an orthogonal coordinate system and applied to the work shape before elastic recovery; and a comparison calculating unit for comparing the region-stress application deformation amount in a case where the stress distribution of the main influence region is applied with the component-stress application deformation amount, and identifying the stress component in a direction having the smallest difference thereof as a main influence stress component that is the stress component most related to the shape defect of the evaluation point of before and after the elastic recovery.

Preferably, the shape defect factor identification device further includes an elastic recovery amount calculating unit for calculating a deformation amount based on the elastic recovery of the evaluation point of before and after the elastic recovery in a case where the stress distribution in which the main stress component acting on substantially the middle in a plate-thickness direction of the main influence region is evenly distributed over the entire range in the plate-thickness direction of the main influence region is applied to the work shape before elastic recovery; and a calculation processing unit for comparing the deformation amount with the component-stress application deformation amount in a case where the main influence stress component is applied to the main influence region, and determining presence of influence of the stress difference of front and back of the plate thickness of the main influence stress component on the shape defect of the evaluation point of before and after the elastic recovery.

A shape defect factor identification method according to a third aspect of the present invention relates to a shape defect factor identification method including stress distribution calculation step of calculating a stress distribution that acts on a work before elastic recovery; elastic recovery amount calculation step of calculating a deformation amount based on an elastic recovery of a certain evaluation point of before and after the elastic recovery in a case where the stress distribution is applied to the work before elastic recovery; elastic recovery amount calculation step of calculating a region-stress application deformation amount based on the elastic recovery of the evaluation point of before and after the elastic recovery in a case where the work shape is divided into a plurality of regions set in advance, and the stress distribution is applied to the work shape before elastic recovery for every region; and comparison calculation step of comparing the deformation amount with the region-stress application deformation amount, and identifying a region having the smallest difference thereof as a main influence region that is a stress distribution region most related to a shape defect of the evaluation point of before and after the elastic recovery.

Preferably, the shape defect factor identification method further includes elastic recover amount calculation step of calculating a component-stress application deformation amount based on the elastic recovery of the evaluation point of before and after the elastic recovery in a case where the stress distribution acting on the main influence region is decomposed in each direction component of an orthogonal coordinate system and applied to the work shape before elastic recovery; and comparison calculation step of comparing the region-stress application deformation amount in a case where the stress distribution of the main influence region is applied with the component-stress application deformation amount, and identifying the stress component in a direction having the smallest difference thereof as a main influence stress component that is the stress component most related to the shape defect of the evaluation point of before and after the elastic recovery.

Preferably, the shape defect factor identification method further includes elastic recovery amount calculation step of calculating a deformation amount based on the elastic recovery of the evaluation point of before and after the elastic recovery in a case where the stress distribution in which the main stress component acting on substantially the middle in a plate-thickness direction of the main influence region is evenly distributed over the entire range in the plate-thickness direction of the main influence region is applied to the work shape before elastic recovery; and calculation process step of comparing the deformation amount with the component-stress application deformation amount in a case where the main influence stress component is applied to the main influence region, and determining presence of influence of the stress difference of front and back of the plate thickness of the main influence stress component on the shape defect of the evaluation point of before and after the elastic recovery.

According to the present invention, the factor that causes deformation of before and after the elastic recovery at a certain evaluation point of the work, that is, a site having a stress distribution having the most influence can be identified in molding process. Therefore, the factor of shape defect of the work arising from the elastic recovery of deformation during the molding process can be identified.

BRIEF DESCRIPTION OF THE DRAWINGS

FIG. 6 is a flowchart of a process for identifying the main influence stress component.

FIG. 10 is a view describing an idea of dividing the work into regions in a short side direction.

FIG. 11 is a view showing an embodiment of dividing the work into regions in the short side direction.

FIG. 13 is a view showing a displacement amount of an evaluation point in a case where stress is applied by component.

BEST MODE FOR CARRYING OUT THE INVENTION

Figure 1:
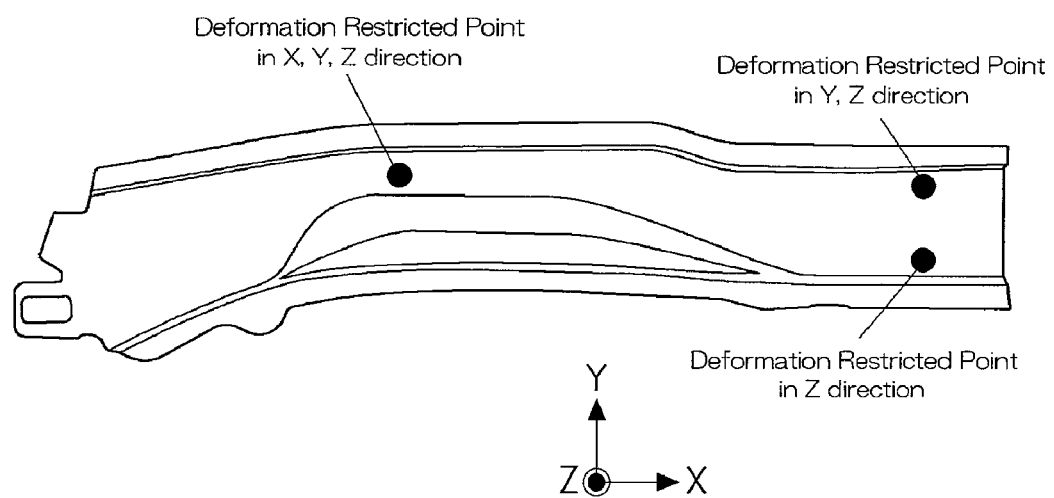
FIG. 1 is a view showing work according to an embodiment of the present invention.
Figure 2:
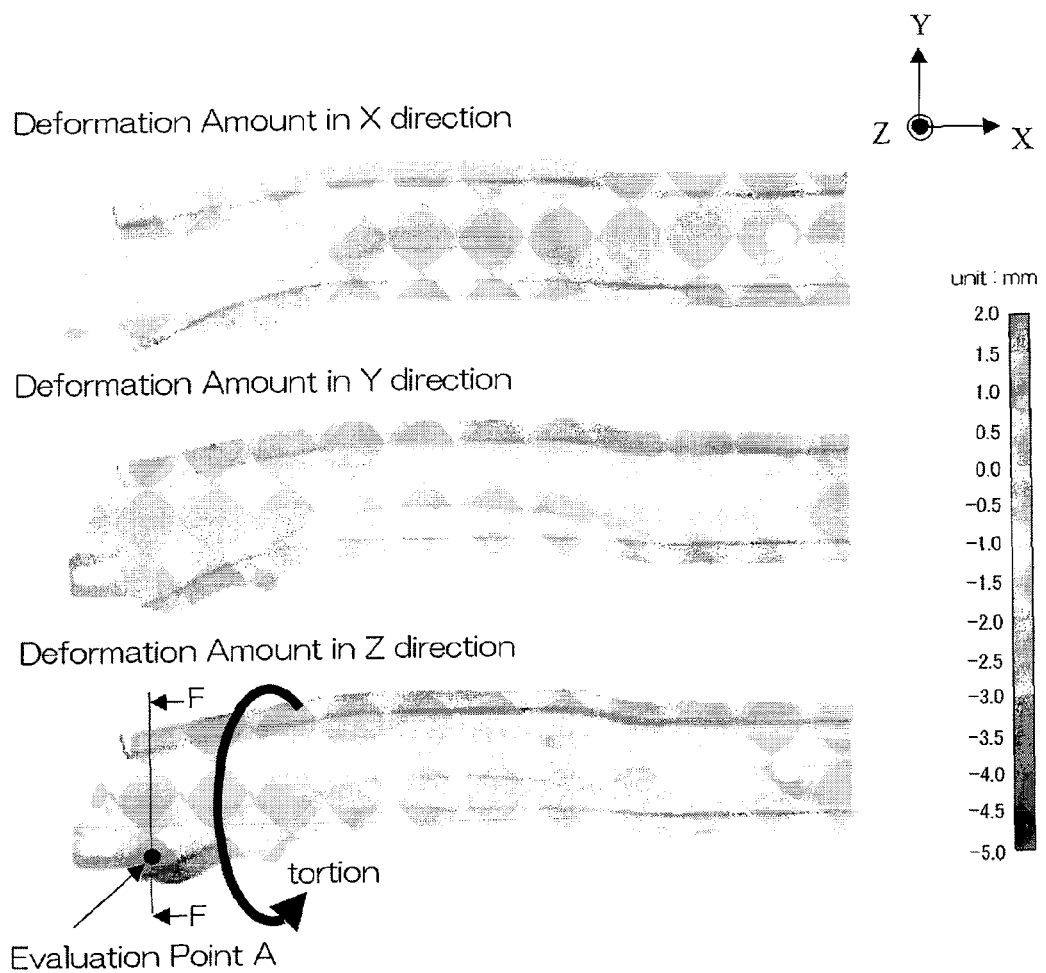
FIG. 2 is a view showing a displacement amount after elastic recovery of the work.
Figure 3:
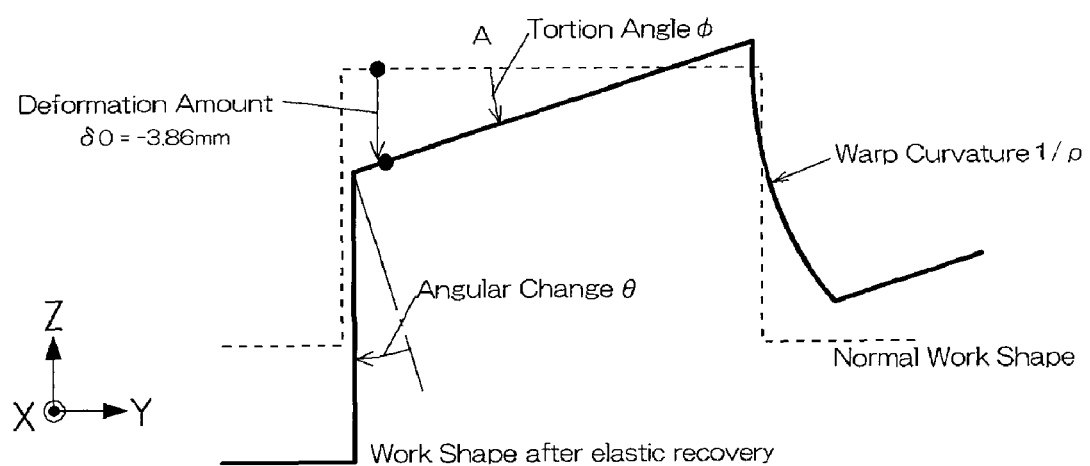
FIG. 3 is a cross-sectional view taken along F-F line of FIG. 2.

FIG. 1 is a view showing work according to an embodiment of the present invention. FIG. 2 is a view showing a displacement amount after elastic recovery of the work. FIG. 3 is a cross-sectional view taken along F-F line of FIG. 2.

Figure 4:
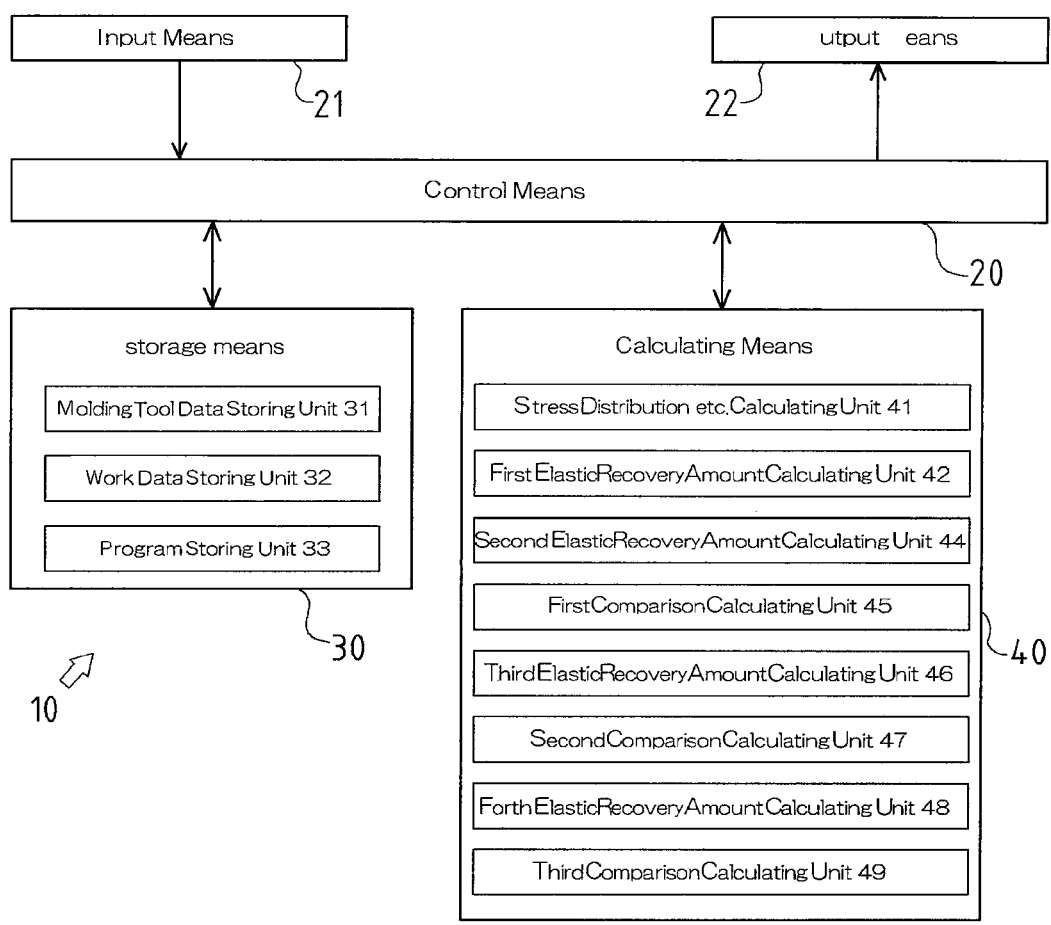
FIG. 4 is a view showing a configuration of a shape defect factor identification device.
Figure 5:
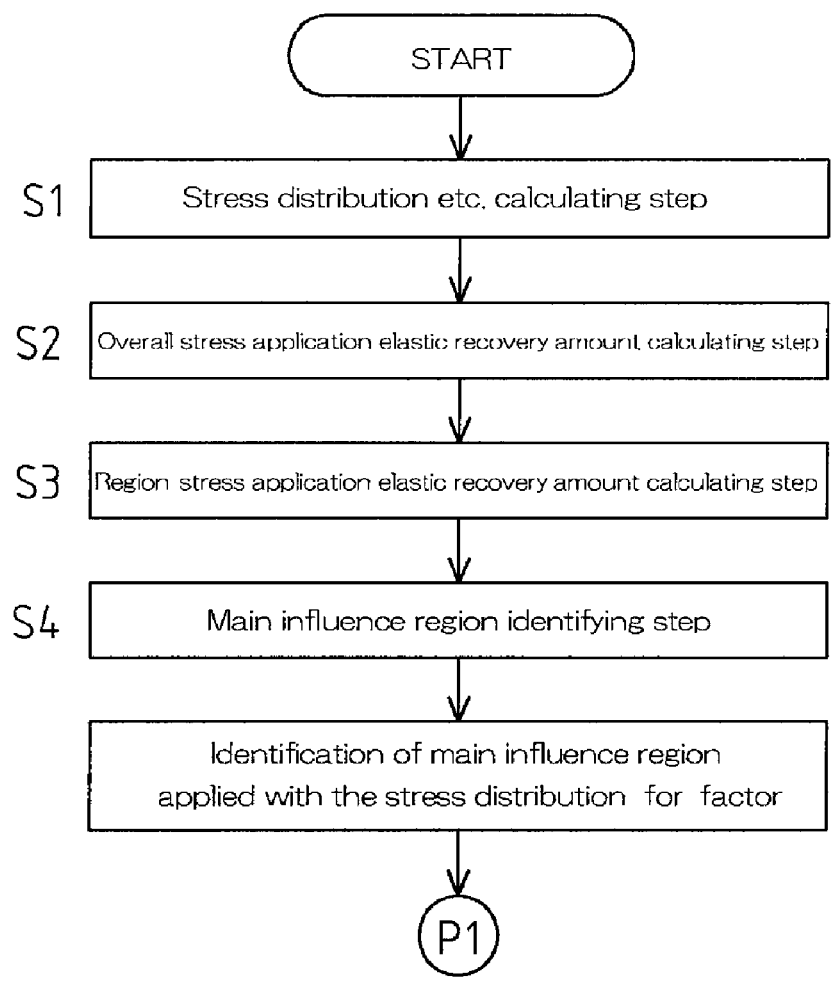
FIG. 5 is a flowchart of a process for identifying the main influence region.
Figure 7:
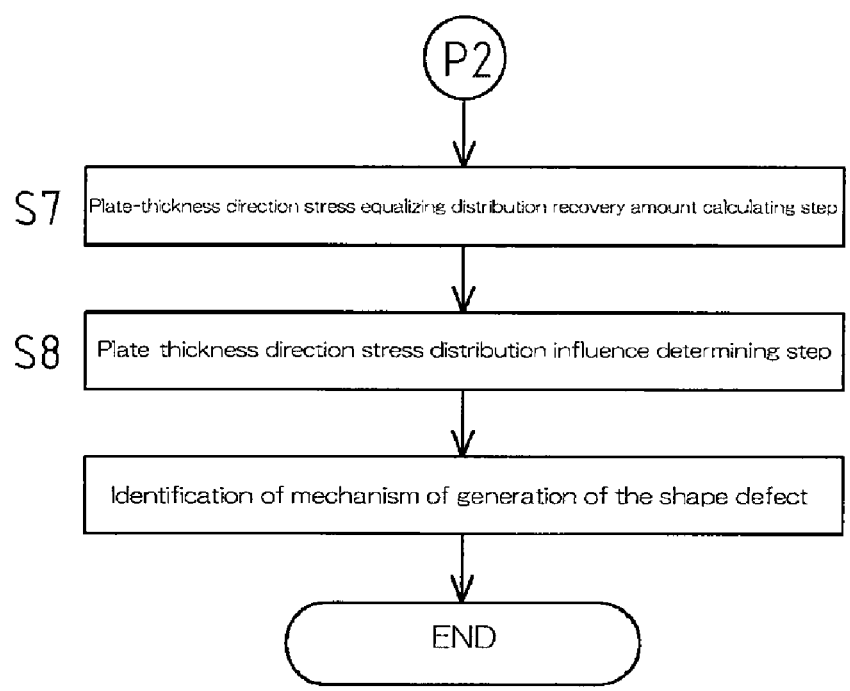
FIG. 7 is a flowchart of a process for determining the influence of distribution in a plate-thickness direction of stress.
Figure 8:
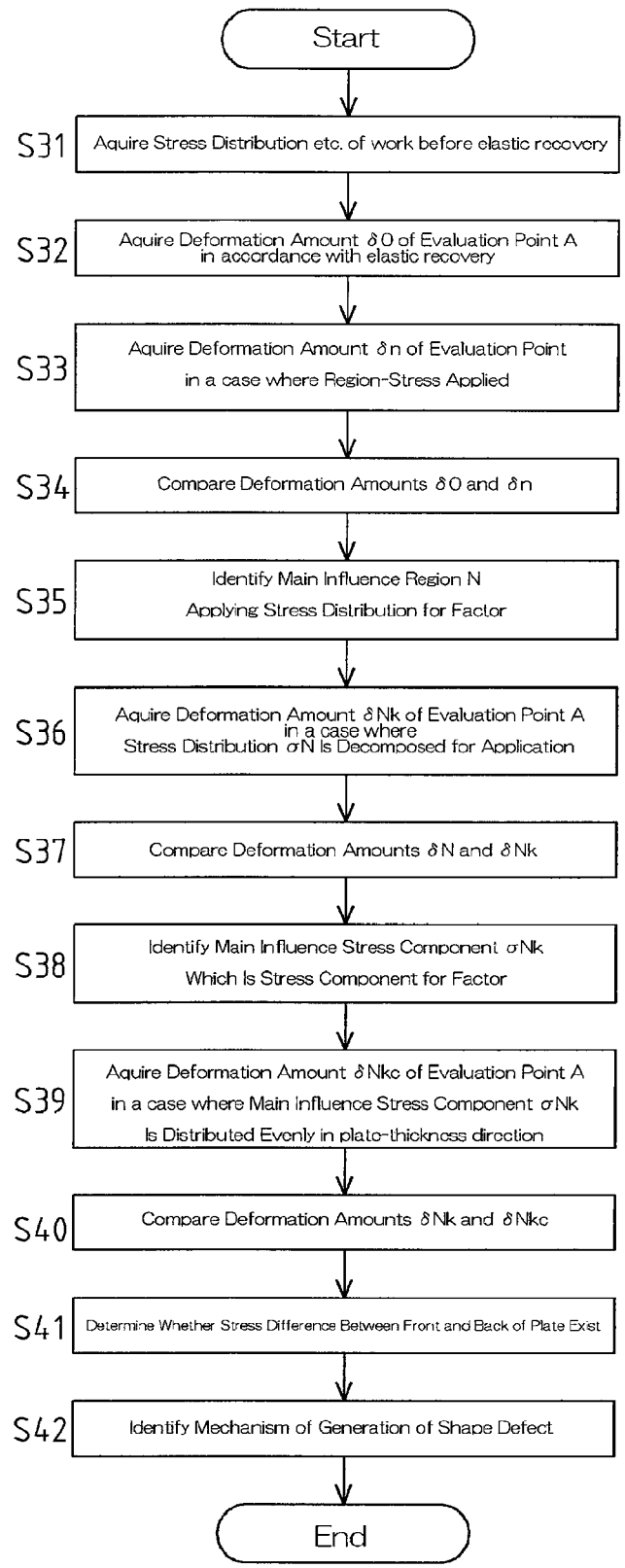
FIG. 8 is a flowchart of a process of a shape defect factor identification program.

FIG. 4 is a view showing a configuration of a shape defect factor identification device. FIG. 5 is a flowchart of a process for identifying the main influence region. FIG. 6 is a flowchart of a process for identifying the main influence stress component. FIG. 7 is a flowchart of a process for determining the influence of distribution in a plate-thickness direction of stress. FIG. 8 is a flowchart of a process of a shape defect factor identification program.

Figure 9:
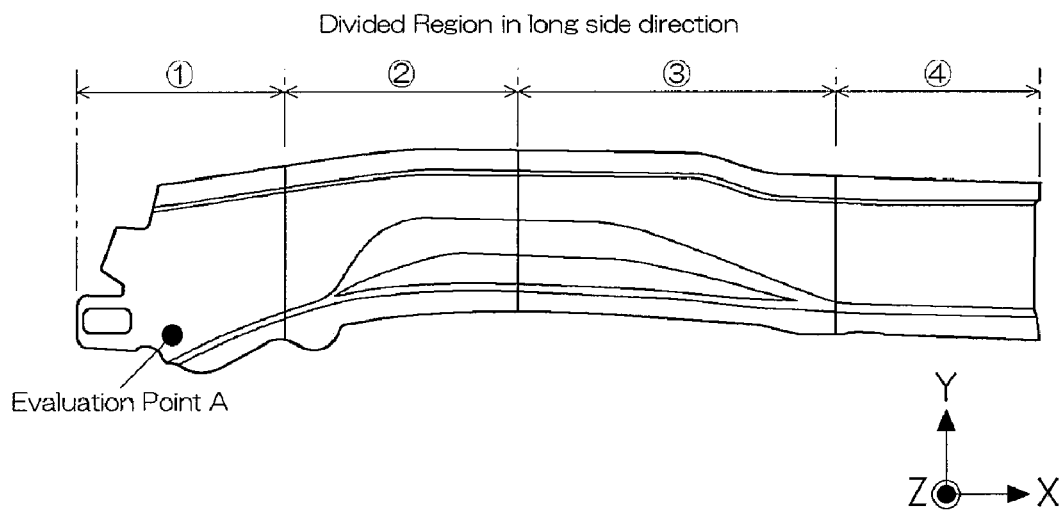
FIG. 9 is a view showing an embodiment of division of the work into regions in a long side direction.
Figure 12:
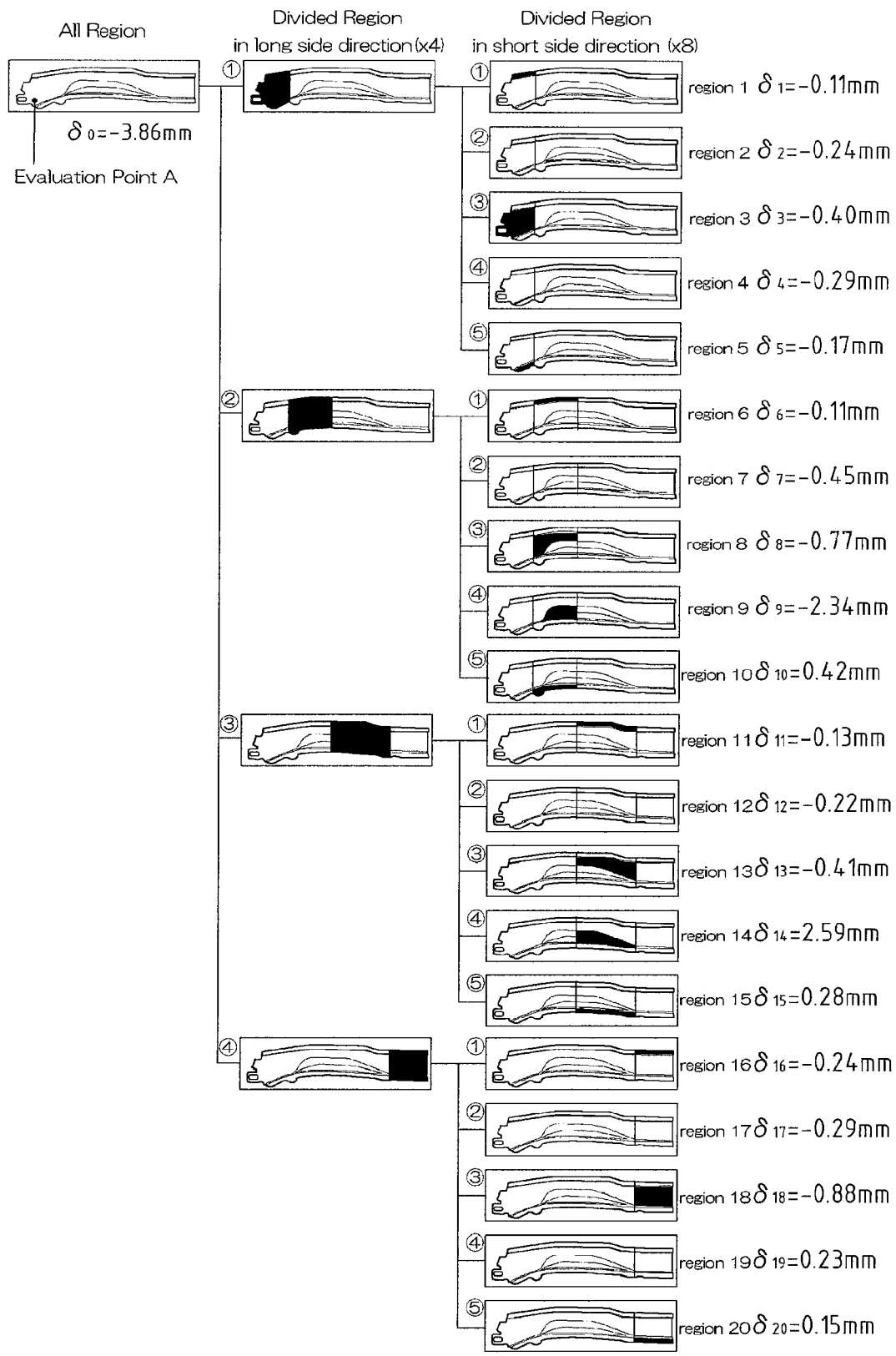
FIG. 12 is a view showing an embodiment of dividing the work into regions.
Figure 14:
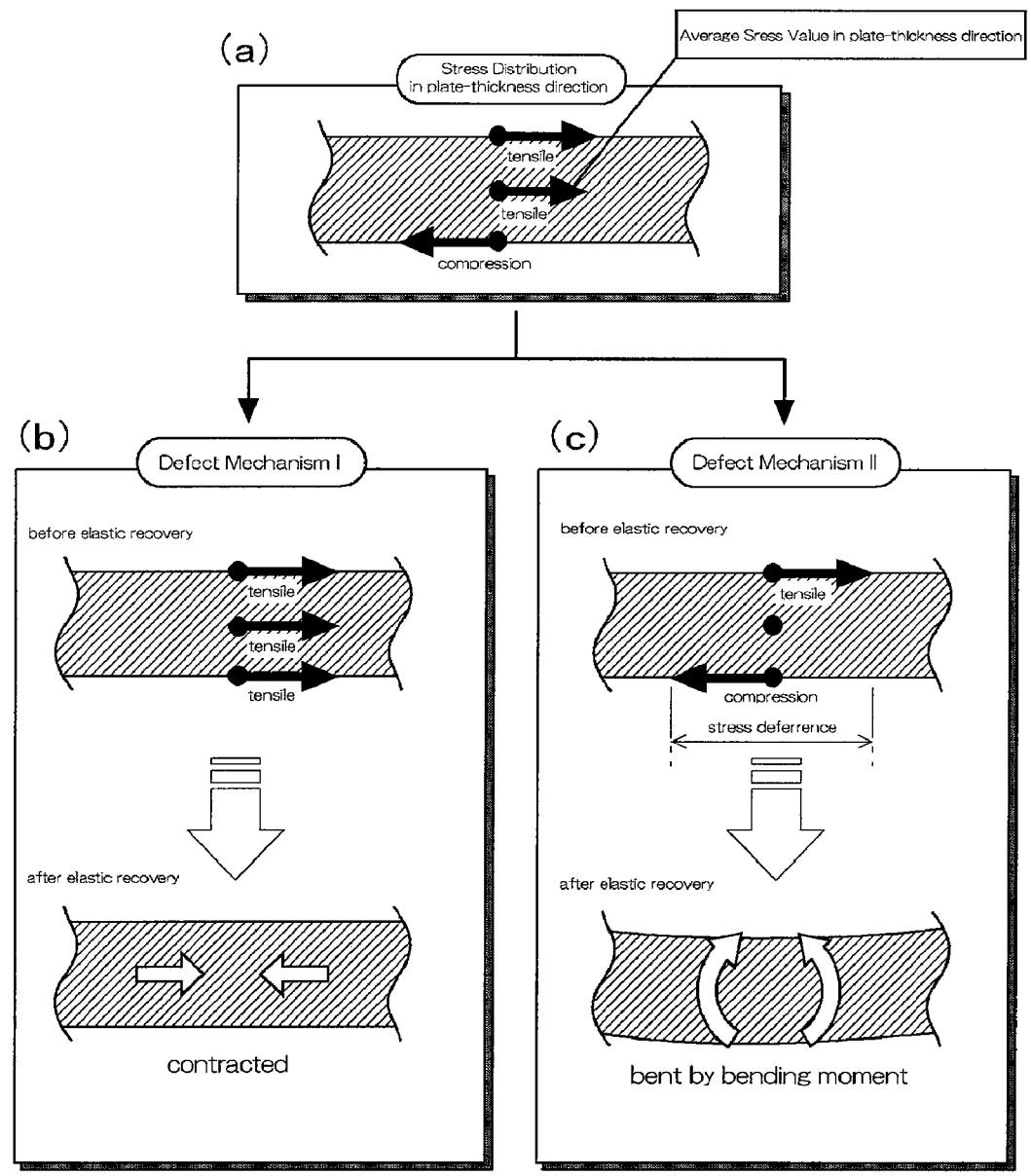
FIG. 14 is a view describing influence of stress distribution that changes in a plate-thickness direction.
Figure 15:
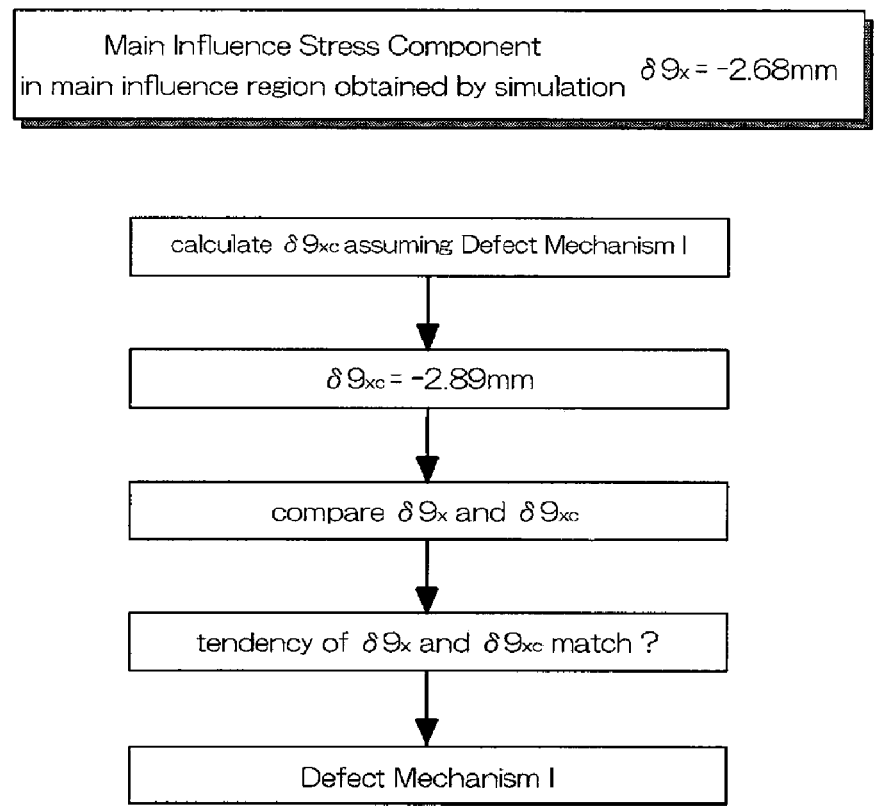
FIG. 15 is a view describing a flow of determining the influence of stress distribution that changes in the plate-thickness direction of the work.

FIG. 9 is a view showing an embodiment of division of the work into regions in a long side direction. FIG. 10 is a view describing an idea of dividing the work into regions in a short side direction. FIG. 11 is a view showing an embodiment of dividing the work into regions in the short side direction. FIG. 12 is a view showing an embodiment of dividing the work into regions. FIG. 13 is a view showing a displacement amount of an evaluation point in a case where stress is applied by component. FIG. 14 is a view describing influence of stress distribution that changes in a plate-thickness direction. FIG. 15 is a view describing a flow of determining the influence of stress distribution that changes in the plate-thickness direction of the work.

The present invention uses the numerical simulation technique and rapidly, reliably, and easily identifies factors (main cause), which arises the elastic recovery of deformation leading to lowering in dimensional accuracy of the work shape.

Thus, in the designing stage, the factors of the shape defect arising from the elastic recovery of deformation in molding process can be excluded or taken into consideration, and the dimensional accuracy of the work shape can be stabilized.

In the embodiment, it is described that a technique for identifying the factor of the elastic recovery of deformation in the press-forming process of a plate material to be processed with the molding tool including a punch and a die.

The molding process to which the present invention is applied is not limited to the press-forming process, and may be widely applied to the plastic molding process for obtaining the work by plastic deforming in which the material to be processed is processed with the molding tool such as casting, rolling, extrusion process, drawing process, and the like.

The work in the embodiment is one of automobile parts shown in FIG. 1.

A state in which the molding tool moved to the molding bottom dead center while applying deformation to the material to be processed during the molding process finishes applying a molding pressure (molding load) on the material to be processed and the work is restricted with the molding tool is the state of "before elastic recovery".

As shown in FIG. 1, a state after the deformation applied to the work is elastically recovered by releasing the restriction by the molding tool while restricting the work before elastic recovery at three points is a state of "after elastic recovery".

In FIG. 2, the displacement amount of the work after elastic recovery is shown by X, Y, Z directions, where it can be seen that displacement is larger in the Z direction compared to other directions at the lower left part of the figure of the work. The point existing at a site greatly displaced compared to others is referred to as an evaluation point A of the present embodiment.

Furthermore, as shown in FIG. 2 and FIG. 3, the evaluation point A is displaced by −3.86 mm in the Z direction shown in the figures at before and after elastic recovery. In the present embodiment, the displacement amount of before and after elastic recovery in the Z direction of largest displacement at the evaluation point A is referred to as "deformation amount $\delta 0$" that is the deformation amount that becomes an index for identifying the factor of the shape defect.

In the present embodiment, the factor that influences the deformation amount $\delta 0$ arising from the elastic recovery of the evaluation point A defined as described above is identified.

However, the "deformation amount $\delta 0$" is the index for evaluating the shape defect of the work, but the deformation amount is not limited to the displacement amount of the evaluation point A, and may be the angular change $\theta$, torsion angle $\phi$, warp curvature $1/\tau$ of a certain site of the work.

The evaluation point A can be arbitrarily defined in the work.

Thus, the factor of the shape defect of the work can be identified by identifying the factor of the shape defect at a plurality of evaluation points or identifying the factor of the shape defect with the site of particularly large deformation amount as the evaluation point.

In the present embodiment, the deformation amount $\delta 0$ is the displacement amount in the Z direction of the evaluation point A, but the deformation amount $\delta 0$ may be the movement amount of the evaluation point A or the displacement amount in other directions. Moreover, in the present embodiment, the evaluation point A is one point, but several points may be the evaluation point, where the total displacement amount of the evaluation points may be the deformation amount $\delta 0$.

The configuration of a shape defect factor identification device according to the embodiment of the present invention will now be described.

As shown in FIG. 4, the shape defect factor identification device 10 includes a calculating means 40 for calculating the calculation process, a storage means 30 for storing information, an input means 21 for inputting information, an output means 22 for outputting the calculation process result by display or print, a control means 20 for controlling each means 40, 30, 21, 22, and the like. In the present embodiment, the shape defect factor identification device 10 is configured by a single or a plurality of computer.

The storage means 30 includes a molding tool data storing unit 31, a work data storing unit 32, and a program storing unit 33.

The molding tool data storing unit 31 stores shape data of the molding tool such as die created by CAD and the like.

Since the molding process according to the present embodiment is press-forming process, the molding tool is dice and punch. The molding tool differs depending on the type of molding process, and is a die if the plastic forming is casting, and is a dice or a cargo container if drawing process or extrusion process.

The work data storing unit 32 stores material characteristic parameters of the material to be processed that becomes the work, shape data and target processed shape of the work (include region to be hereinafter described), and the like.

As the work shape data, the shape data of the work before elastic recovery predicted by numerical simulation using finite element method, and data of the work after elastic recovery predicted by spring back simulation are stored, as hereinafter described.

The program storing unit 33 stores an application program executed by the shape defect factor identification device 10. The application program includes a molding simulation program, a spring back simulation program, a shape defect factor identification program, and the like.

The calculating means 40 includes a stress distribution etc. calculating unit 41, a first elastic recovery amount calculating unit 42, a second elastic recovery amount calculating unit 44, a first comparison calculating unit 45, a third elastic recovery amount calculating unit 46, a second comparison calculating unit 47, a fourth elastic recovery amount calculating unit 48, and a third comparison calculating unit 49.

The flow of process for identifying the factor of the shape defect of the work arising from the elastic recovery of deformation in the shape defect identifying device 10 will be hereinafter described using FIG. 6 to FIG. 9. The function of each calculating unit in the calculating means 40 will also be described along the flow of the process.

In the shape defect factor identification device 10, there is performed the process of identifying the factor of the shape defect of the work arising from the elastic recovery of deformation by executing the shape defect identifying program.

[Stress Distribution Etc. Calculating Step S1]

When the shape defect identifying program is executed in the shape defect factor identification device 10, acquisition of stress distribution and strain distribution that act on the work before elastic recovery is performed (S31).

The stress distribution and the stress distribution are hereinafter described as "stress distribution etc.".

In order to acquire the stress distribution etc. that acts on the entire work before elastic recovery, the molding simulation program is executed in the stress distribution etc. calculating unit 41 of the calculating means 40, and the calculating process of calculating the stress distribution etc. that acts on the entire work before elastic recovery is performed.

In the stress distribution etc. calculating unit 41, there is performed the material numerical simulation (molding simulation) of obtaining the work by plastic deforming the material to be processed with the molding tool based on the given plastic forming condition.

A general numerical analysis method such as finite element method can be used for the molding simulation, where the plastic forming condition can be defined based on information etc. stored in the molding tool data storing unit 31 and the work data storing unit 32.

The shape of the work before elastic recovery and the stress distribution etc. that acts on the entire work are calculated through the molding simulation.

[Overall Stress Application Elastic Recovery Amount Calculating Step S2]

Following the stress distribution calculating step S1, in the calculating means 40, there is performed the acquisition of the deformation amount $\delta 0$ of the evaluation point A of before and after the elastic recovery in a case where the stress distribution etc. that acts on the work before elastic recovery is applied to the work shape before elastic recovery (S32).

To this end, the spring back simulation program is executed in the first elastic recovery amount calculating unit 42 of the calculating means 40, and the calculation process of calculating the deformation amount $\delta 0$ of the evaluation point A of before and after the elastic recovery in a case where the stress distribution etc. that acts on the entire work before elastic recovery is applied to the work shape before elastic recovery is performed.

In the first elastic recovery amount calculating unit 42, the stress distribution etc. of before elastic recovery is applied to the shape of the work before elastic recovery, and the numerical simulation (spring back simulation) of the work shape from before elastic recovery to after elastic recovery is performed. The shape of the work after elastic recovery is calculated through the spring back simulation and the deformation amount $\delta 0$ of the evaluation point A based on the elastic recovery of deformation is obtained.

A known analysis method as disclosed in Japanese Laid-Open Patent Publication No. 2000-312933 and Japanese Laid-Open Patent Publication No. 2003-340529 is used for the spring back simulation.

[Region-Stress Application Elastic Recovery Amount Calculating Step S3]

In the calculating means 40 that has acquired the deformation amount $\delta 0$ of the evaluation point A based on the elastic recovery of deformation as described above, the stress distribution etc. that acts on the entire work before elastic recovery is divided into a plurality of regions set in advance, and the acquisition of the displacement amount (region-stress application displacement amount) $\delta n$ ($n=1$ to $n_e$, $n_e$: number of regions) of the evaluation point A of before and after elastic recovery in a case where applied to the shape of the work before elastic recovery is performed (S33).

To this end, the spring back simulation program is executed in the second elastic recovery amount calculating unit 44, and there is performed the calculation process of calculating the deformation amount $\delta n$ ($n=1$ to $n_e$) of before and after the elastic recovery of the evaluation point A based on elastic recovery of deformation in a case where the stress distribution etc. that acts on the entire work before elastic recovery is divided by the plurality of regions set in advance, and applied to the work shape before elastic recovery.

The deformation amount $\delta n$ ($n=1$ to $n_e$) of before and after the elastic recovery of the evaluation point A in a case where the stress is applied by regions is calculated for each region n ($n=1$ to $n_e$).

Here, "region" is obtained by virtually dividing the shape of the work before elastic recovery into a plurality of (number of divisions $n_e$) regions, and is set in the shape defect factor identification device 10 in advance.

In order to calculate the deformation amount $\delta n$ ($n=1$ to $n_e$) of the evaluation point A in a case where the stress is applied by regions, the stress distribution etc. applied to the shape of the work before elastic recovery is obtained by dividing the stress distribution etc. that acts on the entire work acquired in the stress distribution calculating step S1 by regions.

Therefore, in order to obtain the deformation amount $\delta n$ of the evaluation point A in a case where stress is applied to region n, the process of applying the stress distribution etc. of the region n to the work shape before elastic recovery (overall shape of work), performing the numerical simulation (spring back simulation), calculating the work shape after elastic recovery, and calculating the deformation amount $\delta n$ of the evaluation point is performed in the second elastic recovery amount calculating unit 44. The deformation amount $\delta n$ ($n=1$ to $n_e$) of the evaluation point A is obtained by performing such calculation process on each region n (n=1 to $n_e$).

The region is defined according to the shape of the work in advance. Here, if determined so as to divide the shape of the work in accordance with the deformation behavior of the material to be processed in plastic forming, the mainly influenced site close to the essential quality can be identified, and thus is preferable. For instance, the region can be determined by performing division by the flow-in amount of the material to be processed in plastic forming, division by each stage of plastic forming, or division by the shape of work.

As shown in FIG. 9, in the case of the work according to the present embodiment, the shape of the work is divided into four regions in a long side direction. Furthermore, as shown in FIG. 11, the shape of the work is divided into five regions in a short side direction, and thus the work according to the present embodiment is divided into a total of twenty regions.

As shown in FIG. 10, when the cross-sectional shape in the short side direction has a convex shape expanded to one side, the deformation behavior of each region is easily recognized and thus is desirable by, as a general rule, dividing the cross-sectional shape at before and after the bending location.

The area Sn (n=1 to ne) of each region is desirably substantially the same.

[Main Influence Region Identifying Step S4]

Following the region-stress application elastic recovery calculating step S3, in the first comparison calculating unit 45, there is performed a comparison calculation of the deformation amount δ0 of the evaluation point A and the deformation amount δn (n=1 to $n_e$) of the evaluation point A in a case where stress is applied by regions (S34).

Furthermore, in the first comparison calculating unit 45, the region N where the difference (absolute value of difference) of the deformation amount δ0 and the deformation amount δn (n=1 to $n_e$) becomes the smallest is identified as "main influence region N" that is the region having stress distribution etc. most related to the deformation amount δ0 of the evaluation point A of before and after the elastic recovery (S35).

That is, of the deformation amount δn (n=1 to $n_e$) of the evaluation point A acquired in the region-stress application elastic recovery amount calculating step S3, the deformation amount δN of the evaluation point A in a case where stress distribution σN and strain distribution εN of the main influence region N are applied is a numerical value closest to the deformation amount δ0 of the evaluation point A.

As shown in FIG. 12, in the case of the work according to the present embodiment, the deformation amount δ0 of the evaluation point A is −3.86 mm, and thus the absolute value of the difference with the deformation amount δ9=−2.34 mm of region 9 of the deformation amount δn (n=1 to 20) of the evaluation point A in a case where stress is applied by region is the smallest, and the region 9 is identified as the main influence region N.

If the area Sn (n=1 to $n_e$) of each region greatly differs, the evaluation index in which the area is corrected may be used in place of the deformation amount δn (n=1 to $n_e$) as in {Δn·Sn/S0(n=1 to $n_e$)}. However, S0 indicates the area of the entire molded article.

As described above, in the shape defect factor identification device 10, the main influence region N applied with the stress distribution σN and the strain distribution εN including factors most related to the displacement of the evaluation point A of before and after the elastic recovery can be identified by executing each step of S1 to S4.

[Component-Stress Application Elastic Recovery Amount Calculating Step S5]

In the calculating means 40, there is performed the acquisition of the displacement amount <component-stress application displacement amount> $δN_k$ (k=x, y, z) of before and after the elastic recovery of the evaluation point A in a case where the stress distribution σN that acts on the main influence region N is decomposed into each direction component ($σN_x$, $σN_y$, $σN_z$) of the orthogonal coordinate system (XYZ coordinate system in the present embodiment), then the decomposed stress distribution σN and the strain distribution εN are applied to the work shape before elastic recovery after identifying the main influence region N(S36).

To this end, in the third elastic recovery amount calculating unit 46, the spring back simulation program is executed, then the stress distribution σN of the main influence region N is decomposed into $σN_x$, $σN_y$, $σN_z$ in the XYZ direction of the orthogonal coordinate system before elastic recovery, the resultant is independently applied to the work shape before elastic recovery, and the numerical simulation (spring back simulation) of the work shape from before elastic recovery to after elastic recovery is performed.

The work shape after elastic recovery is calculated through the spring back simulation, and the deformation amount $δN_k$ (k=x, y, z) of before and after the elastic recovery of the evaluation point A based on the elastic recovery of deformation is calculated.

[Main Influence Stress Component Identifying Step S6]

Subsequently, in the second comparison calculating unit 47, the deformation amount δN of the evaluation point A in a case where the stress distribution σN is applied to the main influence region N and the deformation amount $δN_k$ (k=x, y, z) of the evaluation point A in a case where the stress distribution σN of the main influence region X is applied by component are compared and calculated (S37).

Furthermore, the stress component $σN_k$ (k=x or y or z) in the direction the difference (absolute value of difference) becomes the smallest is identified as "main influence stress component $σN_k$" or the stress component most related to the deformation amount δ0 of the evaluation point A of before and after the elastic recovery (S38).

As shown in FIG. 12 and FIG. 13, in the case of the work according to the present embodiment, the region 9 is the main influence region N and deformation amount δN of the evaluation point A in a case where the stress distribution σN is applied to the main influence region N is −2.34 mm. Of the deformation amount $δN_k$ (k=x, y, z) of the evaluation point A in a case where the stress distribution σN of the main influence region N is applied by component, the deformation amount δ9=−2.68 mm in the x direction has the smallest difference with the deformation amount δN, and thus the stress component $σ9_x$ in the x direction of the region 9 is identified as the main influence stress component $σN_k$.

As described above, in the shape defect factor identification device 10, after identifying the main influence region N in each step of S1 to S4, the main influence stress component $σN_k$ in the stress distribution of the main influence region N having the most influence on the deformation amount δ0 of the evaluation point A of before and after the elastic recovery can be identified by each step of S5 and S6.

[Plate-Thickness Direction Stress Equalizing Distribution Recovery Amount Calculating Step S7]

In the main influence region N, the main influence stress component $σN_k$ changes in the plate-thickness direction of the work.

For instance, as shown in FIG. 14(*a*), as a result of the molding simulation, when stress distribution is generated such as tensile stress on one of front or back side at the cross section of the work, compression stress on the other one of the front or the back side, and the tensile stress at substantially the middle in the plate-thickness direction, two types of mechanisms of <defect mechanism I> shown in FIG. 14(*b*) or <defect mechanism II> shown in FIG. 14(*c*) are assumed for the mechanism of the generation of the shape defect in the work, where the shape defect is assumed to generate in the work due to compound of <defect mechanism I> and <defect mechanism II>.

In the <defect mechanism I>, the main influence region deforms so as to contract or stretch in an in-plane direction after elastic recovery by one of the stresses of the tensile stress or the compression stress acting on most part in the plate-thickness direction before the elastic recovery, so that the shape defect occurs.

In the <defect mechanism II>, the shape defect occurs as the bending moment acts on the main influence region so as to alleviate the stress difference between the front and the back in the plate-thickness direction after elastic recovery as a result of generation of stress of different sign (direction is opposite) for the front and the back in the plate-thickness direction before elastic recovery.

The measures for preventing the generation of shape defect differ between the <defect mechanism I> and the <defect mechanism II>. For instance, when corresponding to <defect mechanism I>, measures for alleviating the compression stress or the tensile stress of the entire plate-thickness direction are adopted, whereas when corresponding to <defect mechanism II>, measures for reducing the stress difference between the front and the back of the plate thickness are adopted.

Since the measures to be adopted to prevent the generation of shape defect differ, it is effective to accurately determine which mechanism is dominantly acting of the mechanisms causing shape defect after identifying the main influence stress component $\sigma N_k$ in the stress distribution of the main influence region N.

Thus, the presence (superiority) of influence on the shape defect of the evaluation point A of before and after the elastic recovery of the stress difference between the front and the back of the plate thickness of the main influence stress component is examined.

In the calculating means 40, after identifying the main influence region N and the main influence stress component $\sigma N_k$, there is performed acquisition of the deformation amount $\delta N_{kc}$ of before and after the elastic recovery of the evaluation point A based on the elastic recovery of deformation in a case where the stress distribution in which the average stress value in the plate-thickness direction of the main influence region N is evenly distributed only in the k direction of the plate-thickness direction of the main influence region N is applied to the work shape before elastic recovery (S39).

Here, "average stress value in the plate-thickness direction of the main influence region N" is the main influence stress component $\sigma N_k$ acting on substantially the middle in the plate-thickness direction of the main influence region N.

To this end, in the fourth elastic recovery amount calculating unit 48, the spring back simulation program is executed, the stress distribution in which the main influence stress component $\sigma N_k$ acting on substantially the middle in the plate-thickness direction of the main influence region N is evenly distributed in the plate-thickness direction of the main influence region N is applied to the work shape before elastic recovery, and the numerical simulation (spring back simulation) of the work shape from before elastic recovery to after elastic recovery is performed.

Furthermore, in the fourth elastic recovery amount calculating unit 48, the work shape after elastic recovery is calculated through the simulation, and the deformation amount $\delta N_{kc}$ (k=x or y or z) of the evaluation point A of before and after the elastic recovery is calculated based on the calculated work shape.

[Plate-Thickness Direction Stress Distribution Influence Determining Step S8]

In the third comparison calculating unit 49, the deformation amount $\delta N_{kc}$ (k=x or y or z) of the evaluation point A acquired in the above manner, and the deformation amount $\delta N_k$ (k=x or y or z) of the evaluation point A in a case where the main influence stress component $\sigma N_k$ of the main influence region N is applied are compared and calculated (S40).

Furthermore, in the third comparison calculating unit 49, whether the value of the main influence stress component $\sigma N_k$ of the main influence region N is changing in the plate-thickness direction, that is, determination is made on whether the stress difference of the front and the plate of the plate thickness is related to the deformation amount $\delta 0$ of the evaluation point A of before and after the elastic recovery (S41), and the mechanism of generation of the shape defect at the evaluation point A is identified (S42).

In identifying whether the value of the main influence stress component $\sigma N_k$ of the main influence region N is changing in the plate-thickness direction, that is, whether the stress difference of the front and the plate of the plate thickness is related to the deformation amount $\delta 0$ of the evaluation point A of before and after the elastic recovery, determination is made on whether or not the tendency of the deformation amount $\delta N_k$ matches with the tendency of the deformation amount $\delta N_{kc}$.

Here, "tendency matches" is defined as a case where the plus and minus of the deformation amount $\delta N_k$ and the deformation amount $\delta N_{kc}$ match, and the deformation amount $\delta N_k$ and the deformation amount $\delta N_{kc}$ satisfy the following equation [eq. 1].

$$0.5 \times |\delta N_k| < |\delta N_{kc}| < 1.5 \times |\delta N_k| \qquad \text{[Eq. 1]}$$

When the tendency of the deformation amount $\delta N_k$ matches with the tendency of the deformation amount $\delta N_{kc}$, the <defect mechanism I> shown in FIG. 14 identified as the generating mechanism that dominantly acts on the shape defect at the evaluation point A, and determination is made that the stress value of either one of the tensile stress or the compression stress acting on most part in the plate-thickness direction of the main influence stress component $\sigma N_k$ influences the shape defect. In other words, determination is made that the stress difference of the front and the back of the plate thickness of the main influence stress component barely influences the shape defect of the evaluation point A of before and after the elastic recovery.

If the above described tendency does not match, the <defect mechanism II> shown in FIG. 14 is identified as the generating mechanism that dominantly acts on the shape defect at the evaluation point A, and determination is made that the stress difference of the front and the back of the plate thickness (plate-thickness direction) of the main influence stress component $\sigma N_k$ influences the shape defect of the evaluation point A of before and after the elastic recovery.

The plate-thickness direction stress distribution determining step S8 will be described using the work according to the present embodiment by way of embodiment using FIG. 15.

The deformation amount of the evaluation point A in a case where the main influence stress component $\sigma 9_x$ of the main influence region 9 is applied to the work is $\delta 9_x = -2.68$ mm. In the main influence region 9, of the stress value of either one of the tensile stress or the compression stress acting on the main part in the plate-thickness direction of the main influence stress component σ9$_x$ (case of <defect mechanism I> of FIG. 14) and the stress difference of the front and the back of the plate thickness of the main influence stress component σ9$_x$ (case of <defect mechanism II> of FIG. 14), which one dominantly influences the shape defect of deformation amount δ9$_x$ of the evaluation point A is not known.

In the main influence region 9, assuming the stress value of either one of the tensile stress or the compression stress acting on most part in the plate-thickness direction of the main influence stress component σ9$_x$ is causing the shape defect (case of <defect mechanism I> of FIG. 14), the deformation amount δ9$_{xc}$ in a case where evenly distributed in the plate-thickness direction is calculated (δ9$_{xc}$=−2.89 mm) with the main influence stress component acting on substantially the middle in the plate-thickness direction of the main influence stress component σ9$_x$ as "average stress value in the plate-thickness direction of the main influence region 9".

Subsequently, determination is made on whether or not the relationship of the deformation amount δ9$_x$(=−2.68 mm) and the deformation amount δ9$_{xc}$ (=−2.89 mm) satisfies [eq. 1].

Since the deformation amount δ9$_x$ (=−2.68 mm) and the deformation amount δ9$_{xc}$ (=−2.89 mm) satisfy [eq. 1], determination is made that the tendency of the deformation amount δ9$_x$ matches with the tendency of the deformation amount δ9$_{xc}$, and the above assumption is assumed to be correct. In other words, in the case of the work according to the present embodiment, the stress value of the tensile stress in the x direction acting on most part in the plate-thickness direction is the factor of shape defect of the evaluation point A in the region 9, as shown in <defect mechanism I> of FIG. 14, and determination is made that the stress difference of the front and the back of the plate thickness of the main influence stress component σ9$_x$ barely influences the shape defect of the evaluation point A of before and after the elastic recovery.

If the relationship between the deformation amount δ9$_x$ and the deformation amount δ9$_{xc}$ does not satisfy [eq. 1], the assumption is not correct, and determination is made that the stress difference of the front and the back of the plate thickness of the main influence stress component σ9$_x$ influences the shape defect of the evaluation point A of before and after the elastic recovery, as shown in <defect mechanism II> of FIG. 14.

As described above, the main influence region N is identified in each step of S1 to s4, the main influence stress component σN$_k$ in the main influence region N is identified in each process of S5 and S6, and the generating mechanism of the shape defect is identified in each step of S7 and S8.

As described above, the shape, the processing conditions, and the like that lead to lowering in dimensional accuracy of the work can be estimated by identifying the factors of the shape defect of the evaluation point A arising from the elastic recovery of deformation using the shape defect factor identification device 10.

Therefore, the defect in dimensional accuracy can be reliably and efficiently reduced and the accuracy can be enhanced by changing the shape of the work or the plastic forming condition to remove the factors of the shape defect of the evaluation point A arising from the elastic recovery of deformation.

INDUSTRIAL APPLICABILITY

The present invention can be used in the technique of identifying the factor of dimensional accuracy defect (shape defect) of the work arising from the elastic recovery of deformation in plastic forming such as casting, rolling, extrusion processing, drawing process, or press working.

The invention claimed is:

1. A non-transitory computer-readable storage medium storing a shape defect factor identification program for causing a computer to execute a process of:
   acquiring a deformation amount based on an elastic recovery of a certain evaluation point of before and after the elastic recovery in a case where stress distribution that acts on a work before elastic recovery is applied to the work before elastic recovery, and acquiring a region-stress application deformation amount based on the elastic recovery of the evaluation point of before and after the elastic recovery in a case where the work shape is divided into a plurality of regions set in advance, and the stress distribution is applied to the work shape before elastic recovery for every region; and
   comparing the deformation amount with the region-stress application deformation amount for identification of a region having the smallest difference thereof as a main influence region that is a stress distribution region most related to a shape defect of the evaluation point before and after the elastic recovery.

2. The non-transitory computer-readable storage medium according to claim 1 for further causing the computer to execute a process of:
   acquiring a component-stress application deformation amount based on the elastic recovery of the evaluation point of before and after the elastic recovery in a case where the stress distribution acting on the main influence region is decomposed in each direction component of an orthogonal coordinate system and applied to the work shape before elastic recovery; and
   comparing the region-stress application deformation amount in a case where the stress distribution of the main influence region is applied with the component-stress application deformation amount for identification of the stress component in a direction having the smallest difference thereof as a main influence stress component that is the stress component most related to the shape defect of the evaluation point before and after the elastic recovery.

3. The non-transitory computer-readable storage medium according to claim 2 for further causing the computer to execute a process of:
   acquiring a deformation amount based on the elastic recovery of the evaluation point of before and after the elastic recovery in a case where the stress distribution in which the main stress component acting on substantially the middle in a plate-thickness direction of the main influence region is evenly distributed over the entire range in the plate-thickness direction of the main influence region is applied to the work shape before elastic recovery; and
   comparing the deformation amount with the component-stress application deformation amount in a case where the main influence stress component is applied to the main influence region, and determining presence of influence of the stress difference of front and back of the plate thickness of the main influence stress component on the shape defect of the evaluation point before and after the elastic recovery.

4. A shape defect factor identification device comprising:
   a stress distribution calculating unit for calculating a stress distribution that acts on work before elastic recovery;
   a first elastic recovery amount calculating unit for calculating a deformation amount based on an elastic recovery of a certain evaluation point of before and after the elastic recovery in a case where the stress distribution is applied to the work before elastic recovery;

a second elastic recovery amount calculating unit for calculating a region-stress application deformation amount based on the elastic recovery of the evaluation point of before and after the elastic recovery in a case where the work shape is divided into a plurality of regions set in advance, and the stress distribution is applied to the work shape before elastic recovery for every region; and a first comparison calculating unit for comparing the deformation amount with the region-stress application deformation amount, and identifying a region having the smallest difference thereof as a main influence region that is a stress distribution region most related to a shape defect of the evaluation point before and after the elastic recovery.

5. The shape defect factor identification device according to claim 4 further comprising:

a third elastic recover amount calculating unit for calculating a component-stress application deformation amount based on the elastic recovery of the evaluation point of before and after the elastic recovery in a case where the stress distribution acting on the main influence region is decomposed in each direction component of an orthogonal coordinate system and applied to the work shape before elastic recovery; and a second comparison calculating unit for comparing the region-stress application deformation amount in a case where the stress distribution of the main influence region is applied with the component-stress application deformation amount, and identifying the stress component in a direction having the smallest difference thereof as a main influence stress component that is the stress component most related to the shape defect of the evaluation point before and after the elastic recovery.

6. The shape defect factor identification device according to claim 5 further comprising:

a forth elastic recovery amount calculating unit for calculating a deformation amount based on the elastic recovery of the evaluation point of before and after the elastic recovery in a case where the stress distribution in which the main stress component acting on substantially the middle in a plate-thickness direction of the main influence region is evenly distributed over the entire range in the plate-thickness direction of the main influence region is applied to the work shape before elastic recovery; and a calculation processing unit for comparing the deformation amount with the component-stress application deformation amount in a case where the main influence stress component is applied to the main influence region, and determining presence of influence of the stress difference of front and back of the plate thickness of the main influence stress component on the shape defect of the evaluation point before and after the elastic recovery.

7. A shape defect factor identification method comprising:

stress distribution calculation step of calculating a stress distribution that acts on work before elastic recovery;

calculating a deformation amount based on an elastic recovery of a certain evaluation point of before and after the elastic recovery in a case where the stress distribution is applied to the work before elastic recovery;

calculating, using a processing device, a region-stress application deformation amount based on the elastic recovery of the evaluation point of before and after the elastic recovery in a case where the work shape is divided into a plurality of regions set in advance, and the stress distribution is applied to the work shape before elastic recovery for every region; and comparing the deformation amount with the region-stress application deformation amount, and identifying a region having the smallest difference thereof as a main influence region that is a stress distribution region most related to a shape defect of the evaluation point before and after the elastic recovery.

8. The shape defect factor identification method according to claim 7 further comprising:

calculating a component-stress application deformation amount based on the elastic recovery of the evaluation point of before and after the elastic recovery in a case where the stress distribution acting on the main influence region is decomposed in each direction component of an orthogonal coordinate system and applied to the work shape before elastic recovery; and comparing the region-stress application deformation amount in a case where the stress distribution of the main influence region is applied with the component-stress application deformation amount, and identifying the stress component in a direction having the smallest difference thereof as a main influence stress component that is the stress component most related to the shape defect of the evaluation point before and after the elastic recovery.

9. The shape defect factor identification method according to claim 8 further comprising:

calculating a deformation amount based on the elastic recovery of the evaluation point of before and after the elastic recovery in a case where the stress distribution in which the main stress component acting on substantially the middle in a plate-thickness direction of the main influence region is evenly distributed over the entire range in the plate-thickness direction of the main influence region is applied to the work shape before elastic recovery; and comparing the deformation amount with the component-stress application deformation amount in a case where the main influence stress component is applied to the main influence region, and determining presence of influence of the stress difference of front and back of the plate thickness of the main influence stress component on the shape defect of the evaluation point before and after the elastic recovery.

* * * * *